United States Patent [19]
Holden et al.

[11] 3,884,958
[45] May 20, 1975

[54] PROCESS FOR THE PREPARATION OF N-ACYL-α-(2- AND 4-HYDROXY)ARYLGLYCINE ESTERS

[75] Inventors: Kenneth G. Holden, Haddonfield, N.J.; Nelson C. F. Yim, Philadelphia, Pa.

[73] Assignee: SmithKline Corporation, Philadelphia, Pa.

[22] Filed: Feb. 28, 1974

[21] Appl. No.: 446,984

[52] U.S. Cl. ............................................. 260/471 C
[51] Int. Cl. .......................................... C07c 125/06
[58] Field of Search .............................. 260/471 C

[56] References Cited
OTHER PUBLICATIONS
Huisgen, R., Chemische Berichte, Vol. 98, (1965), pp. 2,985–2,997 cited.

Primary Examiner—Lorraine A. Weinberger
Assistant Examiner—L. A. Thaxton
Attorney, Agent, or Firm—Janice E. Williams; Alan D. Lourie; William H. Edgerton

[57] ABSTRACT

A new process is disclosed for the preparation of N-acyl-α-(2- and 4-hydroxy)arylglycine esters by rearrangement of N-acyl-α-aryloxyglycine esters upon treatment with a Lewis or protic acid such as boron trifluoride etherate.

9 Claims, No Drawings

PROCESS FOR THE PREPARATION OF N-ACYL-α-(2- AND 4-HYDROXY)ARYLGLYCINE ESTERS

This invention relates to a process for preparing N-acyl-α-(2- and 4-hydroxy)arylglycine esters. In particular, the invention relates to a process for preparing N-acyl-α-(2- and 4-hydroxy)arylglycine compounds of formulas II and III by rearrangement of an N-acyl-α-aryloxyglycine ester of formula I as shown below:

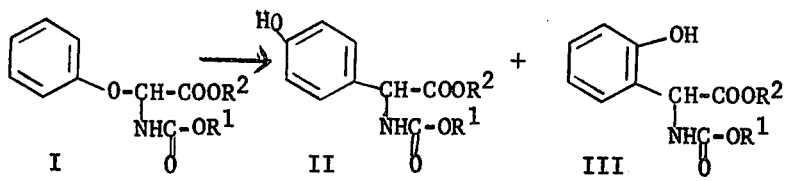

In the above formulas, $R^1$ is any group which with the adjacent carboxyl group forms an amine protective group removable under conditions which are mild enough not to affect the remainder of the molecule. $R^1$ can therefore be t-butyl, benzyl, p-methoxybenzyl, p-nitrobenzyl or $\beta,\beta,\beta$-trichloroethyl.

$R^2$ is a carboxyl protective group which is easily removable or is itself usable in the acylation reaction in which the product glycine compound is used. $R^2$ can therefore be lower alkyl of one to four carbon atoms, including methyl, ethyl and butyl; $\beta,\beta,\beta$-trichloroethyl; benzyl; p-methoxybenzyl; or p-nitrobenzyl.

N-acyl-α-(2- and 4-hydroxy)arylglycines are intermediates useful for preparing antibacterial α-amino-α-arylacetamido penicillins and cephalosporins. Examples of such antibacterial compounds are described in U.S. Pat. Nos. 3,674,776 and 3,489,752 and Belgian Pat. Nos. 796,654 and 798,331. The penicillins and cephalosporins are prepared by acylation of the penicillin or cephalosporin nucleus with the arylglycine. Prior to the acylation reaction, the amino group of the glycine moiety is normally protected with any of a variety of well-known and easily-removed amine protective groups. Thus, one normally must prepare the aryl glycine compound and then protect the amino group prior to the acylation reaction. The advantage of the present process is that one obtains a compound with the amino group already protected in the same reaction in which the aromatic glycine is itself prepared.

The rearrangement comprising the process of this invention is carried out by treating a solution of an N-acyl-α-aryloxyglycine ester of formula I in a nonpolar organic solvent such as benzene, toluene, xylene, ether, chloroform, carbon tetrachloride, ethyl acetate, dioxane, tetrahydrofuran or, preferably, methylene chloride with a catalytic amount of a Lewis or protic acid, for example aluminum chloride, stannic chloride, formic acid, trifluoroacetic acid or, preferably, boron trifluoride as its etherate, which does not react or interfere with the protective groups $R^1$ and $R^2$. The reaction is carried out at a temperature approximately between 0°C and the reflux temperature of the solvent employed, ambient temperature (ca. 25°C) being preferable, until it is substantially complete as indicated by thin layer chromatography. This time will vary from about 1 minute to about 24 hours, 1 to 3 hours being preferred. The product is then isolated and purified according to standard methods, including solvent extraction, chromatography and recrystallization.

Generally the product will consist of a mixture of isomers II and III which are separable by any of several procedures. Among these are well-known chromatographic and crystallization techniques. A preferred method of separation, however, consists of, first, hydrolyzing under basic conditions, for example, with aqueous sodium carbonate, the mixture of N-acyl-α-(2- and 4-hydroxy)arylglycine esters to a mixture of the corresponding glycine acids and, subsequently, converting the 2-hydroxy isomer to its corresponding δ-lactone by standard dehydration methods, for example, by treating the mixture with an agent such as N,N'-dicyclohexylcarbodiimide (DDC), boron trifluoride or acid with removal of the unreacted 4-hydroxy isomer by filtration and/or extraction with dilute base, for example, with aqueous sodium bicarbonate. The lactone can then be reconverted to the N-acyl-α-(2-hydroxy)arylglycine by basic hydrolysis with, for example, aqueous sodium hydroxide or it can be used directly for acylation of the penicillin or cephalosporin nucleus.

The esters of formulas II and III obtained by the process of this invention may be hydrolyzed or, in the case of activated esters, used directly in acylating penicillin and cephalosporin intermediates by well known methods. Use of a base such as sodium bicarbonate or sodium carbonate in aqueous methanol or dioxane is preferred for hydrolysis.

The N-acyl-α-aryloxyglycine ester starting materials (I) are prepared as shown below:

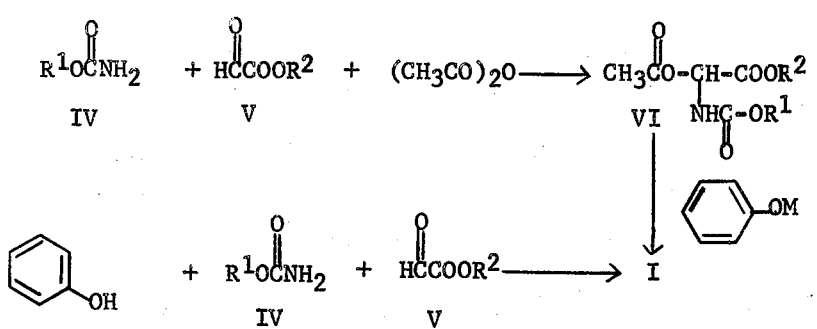

where $R^1$ and $R^2$ are as defined above and M is hydrogen or an alkali metal cation.

Thus, a carbamate of formula IV is condensed with a glyoxylic ester of formula V and acetic anhydride to give an N-acyl-α-acetoxyglycine ester of formula VI. This reaction is carried out either using one of the reactants as a solvent or in an organic solvent such as dioxane, benzene, xylene or toluene. The temperature of the reaction will vary with the reactants, but it is preferable to carry it out at the reflux temperature of the solvent unless lower temperatures are necessary to prevent serious decomposition. The acetoxy group of the N-acyl-α-acetoxyglycine ester is then replaced with the desired aryloxy moiety by reaction of a compound of formula VI with at least one molar equivalent of either phenol or an alkali metal salt thereof (prepared from treatment of phenol with an alkali metal alkoxide). This reaction is carried out in the liquid phase with use of a solvent such as dioxane, ether, methylene chloride or chloroform being preferred. The temperature of the reaction will depend upon the nature of the reactants, but should be approximately between 0°C and the reflux temperature of the solvent employed. In cases where the reaction is sluggish, high temperatures such as those reached in the absence of solvent may be required. The product is then isolated and purified according to standard methods including solvent extraction, chromatography and recrystallization.

Alternatively, the compounds of formula I are prepared by heating phenol with a carbamate (IV) and a glyoxylic ester (V).

The p-nitrobenzyl and p-methoxybenzyl glyoxylic acid esters are prepared according to known procedures, for example by treating glyoxylic acid with a p-nitrobenzyl or p-methoxybenzyl halide in the presence of base.

It will be recognized that, due to the asymmetric α-carbon atom in the glycine compounds of formulas I, II, III and VI, optical isomers will exist. The resolved glycines are readily obtained, when desired, by resolution of the racemic compounds by well-known methods including fractional crystallization of a salt formed with an optically active acid or base. Both the resolved and racemic compounds are usable in the process of the invention and both are comprehended by the definitions used.

Many examples of α-substituted N-acylglycines and glycine esters are found in the prior art. Various α-alkoxy-N-benzoylglycines and glycine esters are described in Zuhr. Obshch. Khim., 25, 1360 (1955); Bull. Soc. Chim. Fr., 530 (1959); Doklady Akad. Nauk S.S.S.R., 106, 675 (1956) and 137, 1377 (1961) and Nippon Kagaku Zasshi, 76, 1022 (1955). N-Phenylacetyl-α-benzyloxyglycine is described in Experientia, 21, 317 (1965), while N-phenylacetyl-α-methoxyglycine is disclosed in U.S. Pat. No. 2,523,621. The corresponding methyl and benzyl esters are found in J. Chem. Soc. C, 14, 1264 (1967) and Ann. Chim. (Rome), 60, 259 (1970), respectively.

Huisgen and Blaschke have prepared N-ethoxycarbonyl-α-benzoylglycine ethyl ester [Chem. Ber., 98, 29585 (1965)]. The preparations of α-hydroxy, α-amino (for example, unsubstituted and substituted anilino, benzylamino and morpholino) and α-halo N-ethoxycarbonyl, N-benzoyl and N-phenylacetylglycine esters are described by Matthies [Pharmazie, 25, 522 (1970)].

Synthesis of N-α-alkoxybenzylbenzamides is described in Tetrahedron, 23, 2869 (1967). Synthesis of an α-carbethoxyiminoacetic ester and conversion to an N-acyl-α-indolylglycine ester are described in Tetrahedron Letters No. 41, 4371 (1968). Synthesis of glycines by means of a Grignard reaction is described in Tetrahedron Letters No. 21, 1813 (1970).

Other references may exist describing compounds similar to those described in the above references. However, the inventors are aware of no disclosure of the preparation of N-acyl-α-(2- and 4-hydroxy)arylglycines or glycine esters by rearrangement of N-acyl-α-aryloxyglycine compounds.

The following examples illustrate the processes of this invention, but are not to be construed as limiting the scope thereof. Temperatures are in degree Centigrade unless otherwise stated.

EXAMPLE 1

N-t-Butoxycarbonyl-2-(4-hydroxyphenyl)glycine n-butyl ester and
N-t-butoxycarbonyl-2-(2-hydroxyphenyl)glycine n-butyl ester A solution of 23.4 g. (0.2 mol.) of t-butyl carbamate [Org. Syn., 48, 32 (1968); U.S. Pat. No. 3,072,710] and 32.2 g. (0.25 mol.) of n-butyl glyoxylate (Org. Syn., Col. Vol. 4, 124) in 150 ml. of acetic anhydride was refluxed for 1.25 hours. The reaction mixture was then cooled, the solvent was removed in vacuo and the residue was molecularly distilled at 130° and 0.05 mm. to give N-t-butoxycarbonyl-2-acetoxyglycine n-butyl ester.

To 2.9 g. (0.01 mol.) of N-t-butoxycarbonyl-2-acetoxyglycine n-butyl ester in 10 ml. of dioxane was added a solution of sodium phenolate prepared from 0.94 g. of phenol and 0.54 g. of sodium methoxide in 15 ml. of dioxane. After refluxing for 2 hours, the solvent was evaporated in vacuo and the residue was dissolved in ethyl acetate. The ethyl acetate solution was washed with cold 10 percent aqueous sodium hydroxide, dried (MgSO$_4$) and concentrated to yield N-t-butoxycarbonyl-2-phenoxyglycine n-butyl ester.

N-t-Butoxycarbonyl-2-phenoxyglycine n-butyl ester was also prepared by heating a mixture of 1.5 g. (0.005 mol.) of N-t-butoxycarbonyl-2-acetoxyglycine n-butyl ester and 0.5 g. (0.005 mol.) of phenol at 150° for 1 hour. The residue was dissolved in ethyl acetate and the resulting solution was washed with cold 10 percent aqueous sodium hydroxide, dried (MgSO$_4$) and concentrated to give the desired glycine ester.

Alternatively, N-t-butoxycarbonyl-2-phenoxyglycine n-butyl ester was prepared by heating a mixture of 11.7 g. (0.1 mol.) of t-butyl carbamate, 16.0 g. (0.13 mol.) of n-butyl glyoxylate and 18.8 g. (0.19 mol.) of phenol at 140° for 1 hour. The cooled reaction mixture was distilled to remove unreacted phenol and afford the glycine ester as an oil.

A solution of 1.5 g. (4.6 mmol.) of N-t-butoxycarbonyl-2-phenoxyglycine n-butyl ester in 100 ml. of methylene chloride was treated with five drops of boron trifluoride etherate. The reaction mixture was stirred at 25° for 3 hours, then chromatographed on 50 g. of silica gel using methylene chloride containing increasing amounts of ethyl acetate as the eluant to effect separation of the product N-t-butoxycarbonyl-2-(4-hydroxyphenyl)glycine n-butyl ester and N-t-butoxycarbonyl-2-(2-hydroxyphenyl)glycine n-butyl ester.

A solution of 0.5 g. (1.5 mmol.) of N-t-butoxycarbonyl-2-(4-hydroxyphenyl)glycine n-butyl ester in 20 ml. of methanol and 30 ml. of 5 percent aqueous sodium carbonate was heated at reflux for 30 minutes. The solvent was removed in vacuo and the aqueous residue was extracted with ethyl acetate. The aqueous phase was acidified to pH 3.0 with phosphoric acid and again extracted with ethyl acetate. The extract was dried (MgSO$_4$) and concentrated to give N-t-butoxycarbonyl-2-(4-hydroxyphenyl)glycine, m.p. 112°–114° (methanol-water).

Similarly, N-t-butoxycarbonyl-2-(2-hydroxyphenyl)glycine n-butyl ester was hydrolyzed to give N-t-butoxycarbonyl-2-(2-hydroxyphenyl)glycine, m.p. 125° (methylene chloride-water).

Alternatively, the crude mixture of N-t-butoxycarbonyl-2-(4-hydroxyphenyl)glycine and N-t-butoxycarbonyl-2-(2-hydroxyphenyl)glycine n-butyl esters was hydrolyzed with 5 percent aqueous sodium carbonate as described above to give a mixture of N-t-butoxycarbonyl-2-(4-hydroxyphenyl)glycine and N-t-butoxycarbonyl-2-(2-hydroxyphenyl)glycine. A solution of this mixture in methylene chloride was treated with 0.5 equivalents of N,N'-dicyclohexylcarbodiimide and stirred at 25° for 1 hour. The mixture was filtered and the filtrate washed with water and cold 5 percent aqueous sodium bicarbonate, dried (Na$_2$SO$_4$) and concentrated to give the δ-lactone of N-t-butoxycarbonyl-2-(2-hydroxyphenyl)glycine. Acidification of the bicarbonate washings with dilute aqueous hydrochloric acid gave N-t-butoxycarbonyl-2-(4-hydroxyphenyl)glycine. The lactone was refluxed with 10 percent aqueous sodium hydroxide in methanol and the reaction mixture was diluted with water and extracted with methylene chloride. Acidification of the aqueous phase with phosphoric acid gave N-t-butoxycarbonyl-2-(2-hydroxyphenyl)glycine.

EXAMPLE 2

When an equivalent amount of methyl glyoxylate [Synthesis, 544 (1972)] is substituted in the procedure of Example 1 for n-butyl glyoxylate, N-t-butoxycarbonyl-2-acetoxyglycine methyl ester is obtained. Reaction of the N-t-butoxycarbonyl-2-acetoxyglycine methyl ester with phenol or sodium phenolate as described in Example 1, followed by treatment of the N-t-butoxycarbonyl-2-phenoxyglycine methyl ester with boron trifluoride etherate as described therein gives a mixture of N-t-butoxycarbonyl-2-(4-hydroxyphenyl)glycine methyl ester and N-t-butoxycarbonyl-2-(2-hydroxyphenyl)glycine methyl ester.

Separation of the isomers is accomplished by the methods described in the procedure of Example 1.

EXAMPLE 3

Substitution of an equivalent amount of ethyl glyoxylate [Synthesis, 544 (1972)] in the procedure of Example 1 for n-butyl glyoxylate gives N-t-butoxycarbonyl-2-acetoxyglycine ethyl ester. Reaction of N-t-butoxycarbonyl-2-acetoxyglycine ethyl ester with phenol or sodium phenolate as previously described followed by treatment of the product N-t-butoxycarbonyl-2-phenoxyglycine ethyl ester with boron trifluoride etherate as described above gives a mixture of N-t-butoxycarbonyl-2-(4-hydroxyphenyl)glycine ethyl ester and N-t-butoxycarbonyl-2-(2-hydroxyphenyl)glycine ethyl ester. The isomers are separated by the methods described in the procedure of Example 1.

In a similar manner, when benzyl glyoxylate, p-methoxybenzyl glyoxylate or p-nitrobenzyl glyoxylate is used in the procedure of Example 1 in place of n-butyl glyoxylate and the resulting N-t-butoxycarbonyl-2-phenoxyglycine ester is rearranged as described above, the corresponding N-t-butoxycarbonyl-2-(2- and 4-hydroxyphenyl)glycine esters are prepared.

EXAMPLE 4

When an equivalent amount of β,β,β-trichloroethyl glyoxylate [J. Amer. Chem. Soc., 88, 852 (1966)] is substituted in the procedure of Example 1 for n-butyl glyoxylate, N-t-butoxycarbonyl-2-acetoxyglycine β,β,β-trichloroethyl ester is obtained. Reaction of N-t-butoxycarbonyl-2-acetoxyglycine β,β,β-trichloroethyl ester with phenol or sodium phenolate as described in Example 1 followed by treatment of the product phenoxyglycine with boron trifluoride etherate as previously described gives a mixture of N-t-butoxycarbonyl-2-(4-hydroxyphenyl)glycine β,β,β-trichloroethyl ester and N-t-butoxycarbonyl-2-(2-hydroxyphenyl)glycine β,β,β-trichloroethyl ester. Separation of the isomers is accomplished by the methods described in the procedure of Example 1.

EXAMPLE 5

Substitution of an equivalent amount of benzyl carbamate for t-butyl carbamate in the initial reaction of the procedure of Example 1 gives N-benzyloxycarbonyl-2-acetoxyglycine n-butyl ester which is converted to N-t-benzyloxycarbonyl-2-phenoxyglycine n-butyl ester by reaction with phenol or sodium phenolate as described therein. Treatment of N-benzyloxycarbonyl-2-phenoxyglycine n-butyl ester with boron trifluoride etherate as previously described gives a mixture of N-benzyloxycarbonyl-2-(4-hydroxyphenyl)glycine n-butyl ester and N-benzyloxycarbonyl-2-(2-hydroxyphenyl)glycine n-butyl ester which is separated according to the methods described in Example 1.

In like manner, N-(β,β,β-trichloroethoxycarbonyl-2-(4-hydroxyphenyl)glycine n-butyl ester and N-(β,β,β-trichloroethoxycarbonyl)-2-(2-hydroxyphenyl)glycine n-butyl ester are prepared by use of β,β,β-trichloroethyl carbamate (U.S. Pat. No. 3,072,710) as a starting material in the procedure of Example 1 with separation of the isomers as described therein.

Likewise, when p-methoxybenzyl carbamate or p-nitrobenzyl carbamate is used as a starting material in the procedure of Example 1 and the resulting N-substituted carbonyl-2-phenoxyglycine n-butyl ester is rearranged as described above, the corresponding N-(p-methoxy- and p-nitrobenzyloxycarbonyl-2-(2- and 4-hydroxyphenyl)glycine n-butyl esters are obtained.

We claim:

1. A process for preparing a compound of the formula:

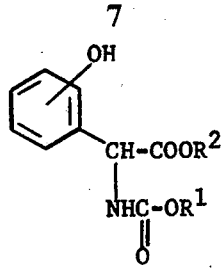

in which:
the hydroxy group is ortho or para to the glycine side chain;
$R^1$ is t-butyl, $\beta,\beta,\beta$-trichloroethyl, benzyl, p-methoxybenzyl or p-nitrobenzyl; and
$R^2$ is lower alkyl of 1 to 4 carbon atoms, $\beta,\beta,\beta$-trichloroethyl, benzyl, p-methoxybenzyl or p-nitrobenzyl;
comprising treating a compound of the formula:

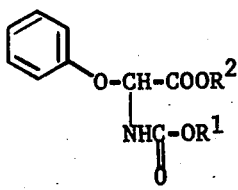

where $R^1$ and $R^2$ are as defined above, in a nonpolar organic solvent with a Lewis or a protic acid catalyst.

2. A process according to claim 1, where the acid catalyst is selected from the group consisting of boron trifluoride etherate, aluminum chloride, stannic chloride, formic acid or trifluoracetic acid.

3. A process according to claim 2, where the acid catalyst is boron trifluoride etherate.

4. A process according to claim 1, where the solvent is benzene, toluene, xylene, ether, chloroform, carbon tetrachloride, ethyl acetate, dioxane, tetrahydrofuran or methylene chloride.

5. A process according to claim 4, where the solvent is methylene chloride.

6. A process according to claim 1, where $R^1$ is t-butyl.

7. A process according to claim 1, where $R^2$ is n-butyl.

8. A process according to claim 1, where N-t-butoxycarbonyl-2-phenoxyglycine n-butyl ester is treated with boron trifluoride etherate.

9. A process according to claim 8, where the solvent is methylene chloride and the reaction is allowed to proceed at 25°C for 3 hours.

* * * * *